US012643230B2

(12) United States Patent
Gautier et al.

(10) Patent No.: US 12,643,230 B2
(45) Date of Patent: Jun. 2, 2026

(54) MOTION LEARNING SYSTEM AND METHOD FOR PROGRAMMING AT LEAST ONE ROBOTIC DEVICE

(71) Applicant: MBDA FRANCE, Le Plessis-Robinson (FR)

(72) Inventors: Nicolas Gautier, Le Plessis-Robinson (FR); Bruno Morisset, Le Plessis-Robinson (FR); Vincent Rafin, Le Plessis-Robinson (FR)

(73) Assignee: MBDA FRANCE, Le Plessis-Robinson (FR)

( * ) Notice: Subject to any disclaimer, the term of this patent is extended or adjusted under 35 U.S.C. 154(b) by 477 days.

(21) Appl. No.: 18/038,645

(22) PCT Filed: Nov. 24, 2021

(86) PCT No.: PCT/FR2021/052084
§ 371 (c)(1),
(2) Date: May 24, 2023

(87) PCT Pub. No.: WO2022/112714
PCT Pub. Date: Jun. 2, 2022

(65) Prior Publication Data
US 2024/0001542 A1     Jan. 4, 2024

(30) Foreign Application Priority Data
Nov. 30, 2020    (FR) .................................. FR2012363

(51) Int. Cl.
B25J 9/16         (2006.01)
B25J 13/00        (2006.01)

(52) U.S. Cl.
CPC ............. *B25J 9/163* (2013.01); *B25J 9/1658* (2013.01); *B25J 9/1664* (2013.01); *B25J 9/1671* (2013.01); *B25J 13/00* (2013.01)

(58) Field of Classification Search
CPC ........ B25J 9/163; B25J 9/1658; B25J 9/1664; B25J 9/1671; B25J 13/00; B25J 9/1656;
(Continued)

(56) References Cited

U.S. PATENT DOCUMENTS 9,272,418 B1      3/2016  Guerin et al.
11,813,749 B2 *  11/2023  Wang ..................... B25J 9/1656
(Continued)

FOREIGN PATENT DOCUMENTS

CN        210361314 U  *  4/2020
JP        2005-135095 A     5/2005
(Continued)

OTHER PUBLICATIONS

Machine translation of CN210361314U.*
(Continued)

*Primary Examiner* — Robert T Nguyen
(74) *Attorney, Agent, or Firm* — Womble Bond Dickinson (US) LLP

(57) ABSTRACT

The invention relates to a system which comprises a workspace (3) storage module (5), at least one pointer (6) respectively associated with a gripper (4) of a robotic device (2), a module (8) for capturing the trajectory performed by the at least one pointer (6), a post-processing module (10) for determining a compatible trajectory of the one or more grippers (4), and a saving module (11), configured to save the compatible trajectory of each of the robotic devices (2).

15 Claims, 4 Drawing Sheets

(58) Field of Classification Search
CPC ......... B25J 9/1682; G05B 2219/39137; G05B 2219/40205; G05B 19/425; G05B 19/418
See application file for complete search history.

(56)                 References Cited

U.S. PATENT DOCUMENTS

| | | | |
|---|---|---|---|
| 2016/0059407 A1 | 3/2016 | Sonoda | |
| 2019/0086907 A1 | 3/2019 | Oestergaard et al. | |
| 2019/0278295 A1 | 9/2019 | Matsuno et al. | |
| 2019/0321983 A1 | 10/2019 | Chen et al. | |
| 2020/0180156 A1 | 6/2020 | Hayaishi et al. | |
| 2020/0316779 A1* | 10/2020 | Truebenbach | B25J 9/1607 |
| 2022/0161431 A1* | 5/2022 | Meister | B25J 9/1666 |
| 2023/0278211 A1* | 9/2023 | Koyama | B25J 9/0081 |
| | | | 700/264 |

FOREIGN PATENT DOCUMENTS

| | | |
|---|---|---|
| JP | 2009-34813 A | 2/2009 |
| JP | 2016-047591 A | 4/2016 |
| JP | 2019-188477 A | 10/2019 |
| WO | WO 2017/085811 A1 | 5/2017 |
| WO | WO 2017/086364 A1 | 5/2017 |
| WO | WO 2018/097223 A1 | 5/2018 |
| WO | WO 2020/073680 A1 | 4/2020 |

OTHER PUBLICATIONS

Hung, Pham Ngoc et al., "*Programming Everyday Task by Demonstration using Primitive Skills for a Manipulator*", The 7th Annual IEEE International Conference on Cyber Technology in Automation, Control, and Intelligent Systems (Cyber), Honolulu, HI, USA, 2017, pp. 321-325, doi: 10.1109/CYBER.2017.8446427.

Praveena, Pragathi et al., "*Characterizing Input Methods for Human-to-robot Demonstrations*", HRI '19: Proceedings of the 14th ACM/IEEE International Conference on Human-Robot Interaction, Mar. 2019, pp. 344-353, ISBN: 978-1-5386-8555-6.

International Search Report and Written Opinion for corresponding PCT Application No. PCT/FR2021/052084, mailed Feb. 11, 2022, Machine Translation of Written Opinion (5 sheets).

Safeea, Mohammad, et al., "On-line collision avoidance for collaborative robot manipulators by adjusting off-line generated paths: an industrial use case", Robotics and Autonomous Systems, vol. 119 (2019) pp. 278-288.

Aleotti, Jacopo, et al., "*Trajectory Clustering and Stochastic Approximation for Robot Programming by Demonstration,*" 2005 IEEE/RSJ International Conference on Intelligent Robots and Systems, Edmonton, AB, Canada, Aug. 2005, pp. 1029-1034, DOI: 10.1109/IROS.2005.1545365.

Billard, Aude, et al., "*Robot Programming by Demonstration*", Handbook of Robotics, Jan. 2008, Springer, Berlin, Heidelberg (25 sheets) DOI: 10.1007/978-3-540-30301-5_60.

Kyrarini, Maria, et al., "*Robot Learning of Object Manipulation Task Actions from Human Demonstrations*", Facta Universitatis, Series: Mechanical Engineering, 2017, vol. 15, No. 2, pp. 217-229, DOI: 10.22190/FUME170515010K.

Rahmatizadeh, Rouhollah, et al., "*Learning real manipulation tasks from virtual demonstrations using LSTM*", https://arxiv.org/abs/1603.03833v2, Sep. 15, 2016 (8 sheets).

Wikipedia, "Programming by demonstration", https://en.wikipedia.org/wiki/Programming_by_demonstration, retrieved Jul. 24, 2024 (5 sheets).

\* cited by examiner

E1

E2

E3

E4

E41

E5

E51     E54

E52     E55

E53     E56

E6

E7

MOTION LEARNING SYSTEM AND METHOD FOR PROGRAMMING AT LEAST ONE ROBOTIC DEVICE

CROSS-REFERENCE TO RELATED APPLICATIONS

This application is a National Phase Patent Application and claims priority to and the benefit of International Patent Application No. PCT/FR2021/052084, filed on Nov. 24, 2021, which claims priority to and the benefit of French Patent Application No. FR2012363, filed on Nov. 30, 2020. The entire contents of both of which are incorporated herein by reference.

TECHNICAL FIELD

The present invention relates to the field of robotics. In particular, it relates to a motion learning system and method for programming at least one robotic device.

PRIOR ART

A robotic system is usually tasked with repetitive or non-repetitive operations to be carried out. The user of a robotic system does not necessarily have the knowledge of industrial robotics to implement a robotic system.

There are already motion capture robotic programming systems (MCRP system) associated with the robotic system that allow a user to program a robotic system without robotic knowledge. In order to program the robotic system, the user takes a learning device from a MCRP system. This learning device is equipped with a pointing device, adapted to the application to be carried out by the robotic system, which the user displaces in the workspace of the robotic system in order to register a motion. The document US 2019/0086907 describes such a MCRP system in which the learning device is the robotic device itself. However, the solution presented in this document is not completely satisfactory.

DESCRIPTION OF THE INVENTION

The present invention aims to overcome the disadvantages of the prior art by proposing a motion learning system for programming at least one robotic device forming a robotic system.

To this end, the invention relates to a motion learning system for programming at least one robotic device equipped with at least one effector and having at least one degree of freedom of motion, the robotic device or devices being intended to evolve in a workspace.

According to the invention, the system comprises:

a workspace storage module, configured to store parameters representative of the workspace;

at least one pointer, the pointer or each of the pointers being associated respectively with an effector of a robotic device, the pointer or each of the pointers being configured to be driven by at least one user along a trajectory which is intended to be made in the workspace by the effector or by each of the effectors, the pointer or each of the pointers being representative of one or more functions to be carried out by the effector or effectors with which the pointer or each of the pointers is associated;

a trajectory capture module configured to store the trajectory made by the pointer or by each of the pointers and to store parameters of the trajectory made by the pointer or by each of the pointers;

a post-processing module, configured to determine for each of the robotic devices:

a compatible trajectory of the effector or effectors with the degree or degrees of freedom of motion of the robotic device or of each of the robotic devices from the trajectory made by the pointer or by each of the pointers stored by the trajectory capture module and compatible parameters of said compatible trajectory of the effector or effectors from the parameters stored by the trajectory capture module;

a saving module, configured to save the compatible trajectory and the compatible parameters of the robotic device or of each of the robotic devices.

Thus, with the invention, a user can easily and quickly program one or more robotic devices of a robotic system. The post-processing module also allows to ensure that the trajectories are compatible with the robotic device or devices.

Advantageously, the learning system further comprises a program generation module, configured to generate and save a program from the compatible trajectory and the compatible parameters saved by the saving module, the program having a language compatible with a language allowing a set in motion of the robotic device or devices.

In addition, the learning system comprises a visualisation module for visualizing the trajectory configured to visualise the trajectory made by the pointer or by each of the pointers with respect to the parameters representative of the workspace.

With the visualisation module, the user can ensure that the trajectories they program are compatible with the workspace.

In addition, the post-processing module comprises:

a first display sub-module, configured to display points of the trajectory made by the pointer or by each of the pointers and stored by the trajectory capture module;

a second display sub-module, configured to display the workspace from the parameters representative of the workspace stored by the storage module;

a third display sub-module, configured to display the parameters of the trajectory made by the pointer or by each of the pointers and stored by the trajectory capture module;

an input sub-module, configured to allow a user to modify points of the trajectory stored by the trajectory capture module and/or modify the parameters of the trajectory stored by the trajectory capture module to obtain said compatible trajectory for the effector or for each of the effectors of the robotic device or of each of the robotic devices and/or said compatible parameters.

In addition, the post-processing module comprises a simulation sub-module, configured to simulate said compatible trajectory of the effector or of each of the effectors of the robotic device or devices and the workspace from parameters representative of the workspace.

Advantageously, the simulation sub-module comprises an augmented reality simulation unit.

In addition, the post-processing module comprises a reproduction sub-module, configured to transmit to the robotic device or devices control commands representative of the trajectory of the pointer or of each of the pointers, to cause the effector or effectors of the robotic device or of each of the robotic devices to simultaneously reproduce the trajectory of the pointer or of each of the pointers driven by the user or the users, to obtain said compatible trajectory for the effector or for each of the effectors of the robotic device or of each of the robotic devices and/or said compatible parameters.

In a first embodiment, the visualisation module comprises an augmented reality simulation sub-module.

According to a second embodiment, the visualisation module comprises an alert sub-module, configured to alert the user of an incompatible trajectory of the pointer or at least one of the pointers, the trajectory being incompatible if the degree or degrees of freedom of the robotic device or devices do not allow said trajectory to be made by the effector or effectors with which the pointer or pointers are associated.

Advantageously, the alert sub-module is configured to alert the user to an incompatible trajectory of the pointer or at least one of the pointers with respect to the parameters representative of the workspace in which the robotic device or devices are intended to evolve.

The invention also relates to a robotic system.

According to the invention, the robotic system comprises:

at least one robotic device equipped with at least one effector and at least one degree of freedom of motion,
a learning system as described above,
an execution module, configured to have the robotic device or each of the robotic devices execute the compatible trajectory and the compatible parameters saved by the saving module.

The invention also relates to a motion learning method for programming at least one robotic device equipped with at least one effector and having at least one degree of freedom of motion, the robotic device or devices being intended to evolve in a workspace, According to the invention, the method comprises the following steps:

a storage step, implemented by a workspace storage module, consisting in storing parameters representative of the workspace in which the robotic device or devices are intended to evolve;
at least one step of driving at least one pointer, implemented by at least one user, the user or users driving at least one pointer associated respectively with an effector of a robotic device, the pointer or each of the pointers being driven by the user or users along a trajectory which is intended to be made in the workspace by the effector or by each of the effectors, the pointer or each of the pointers being representative of one or more functions to be made by the effector or effectors with which the pointer or each of the pointers is associated;
a trajectory capture step, implemented by a trajectory capture module, consisting in storing the trajectory made by the pointer or by each of the pointers and in storing parameters of the trajectory made by the pointer or by each of the pointers;
a post-processing step, implemented by a post-processing module, consisting in determining for each of the robotic devices:
  a compatible trajectory of the effector or effectors with the degree or degrees of freedom of motion of the robotic device or of each of the robotic devices from the trajectory made by the pointer or by each of the pointers stored in the trajectory capture step and compatible parameters of said compatible trajectory of the effector or effectors from the parameters stored in the trajectory capture step;

a saving step, implemented by a saving module, consisting in saving the compatible trajectory and the compatible parameters of the robotic device or of each the robotic devices.

Advantageously, the method further comprises a program generation step, implemented by a program generation module, consisting in generating and saving a program from the compatible trajectory and the compatible parameters saved by the saving module, the program having a language compatible with a language allowing the robotic device or devices to be set in motion.

In addition, the learning method comprises a step for visualizing the trajectory, implemented by a visualisation module for visualizing the trajectory, consisting in visualizing the trajectory made by the pointer or by each of the pointers with respect to the parameters representative of the workspace.

In addition, the post-processing step comprises:
a first display sub-step, implemented by a first display sub-module, consisting in displaying points of the trajectory made by the pointer or by each of the pointers;
a second display sub-step, implemented by a second display sub-module, consisting in displaying the workspace from the parameters representative of the workspace stored in the storage step;
a third display sub-step, implemented by a second display sub-module, consisting in displaying the parameters of the trajectory made by the pointer or by each of the pointers;
an input sub-step, implemented by an input sub-module, consisting in allowing a user to modify points of the trajectory stored in the trajectory capture step and/or modify the parameters of the trajectory stored in the trajectory capture step to obtain said compatible trajectory for the effector or for each of the effectors of the robotic device or of each of the robotic devices and/or said compatible parameters.

In addition, the post-processing step comprises a simulation sub-step, implemented by a simulation sub-module, consisting in simulating said compatible trajectory of the effector or of each of the effectors of the robotic device or devices and the workspace from parameters representative of the workspace.

Furthermore, the post-processing step comprises a reproduction sub-step, implemented by a reproduction sub-module, consisting in transmitting to the robotic device or to the robotic devices control commands representative of the trajectory of the pointer or of each of the pointers, to cause the effector or effectors of the robotic device or of each of the robotic devices to simultaneously reproduce the trajectory of the pointer or of each of the pointers driven by the user or users, to obtain said compatible trajectory for the effector or for each of the effectors of the robotic device or of each of the robotic devices and/or said compatible parameters.

According to the first embodiment, the visualisation step comprises an alerting sub-step, implemented by an alert sub-module, consisting in alerting the user of an incompatible trajectory of the pointer or at least one of the pointers, the trajectory being incompatible if the degree or degrees of freedom of the robotic device or devices do not allow said trajectory to be made by the robotic device or devices with which the pointer or pointers are associated.

According to the second embodiment, the alerting sub-step consists in alerting the user of an incompatible trajectory of the pointer or at least one of the pointers with respect to the parameters representative of the workspace in which the robotic device or devices are intended to evolve.

BRIEF DESCRIPTION OF FIGURES

The invention, with its characteristics and advantages, will become clearer on reading the description made with reference to the attached drawings in which.

DETAILED DESCRIPTION

Figure 1:
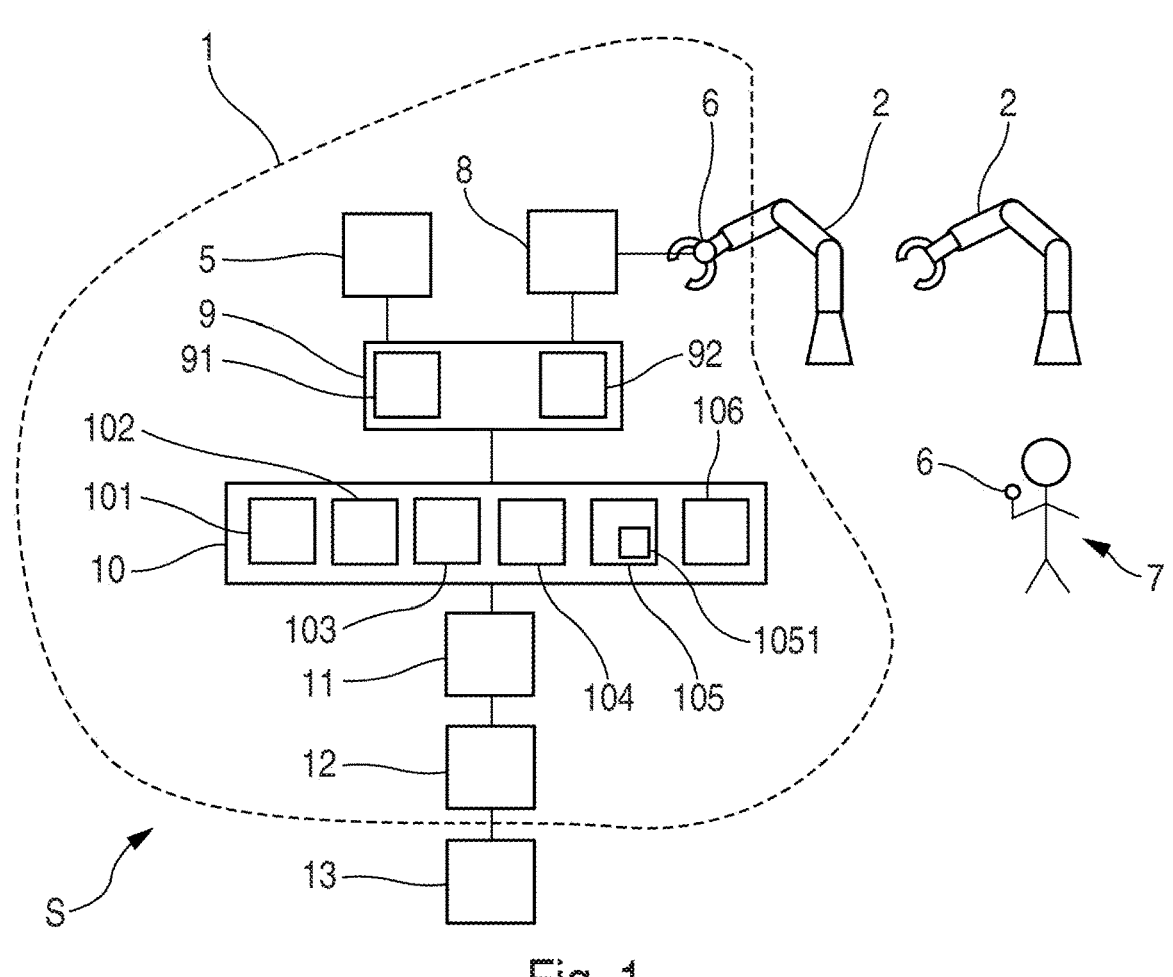
FIG. 1 shows a schematic view of the robotic system, a user and the learning system.
Figure 2:
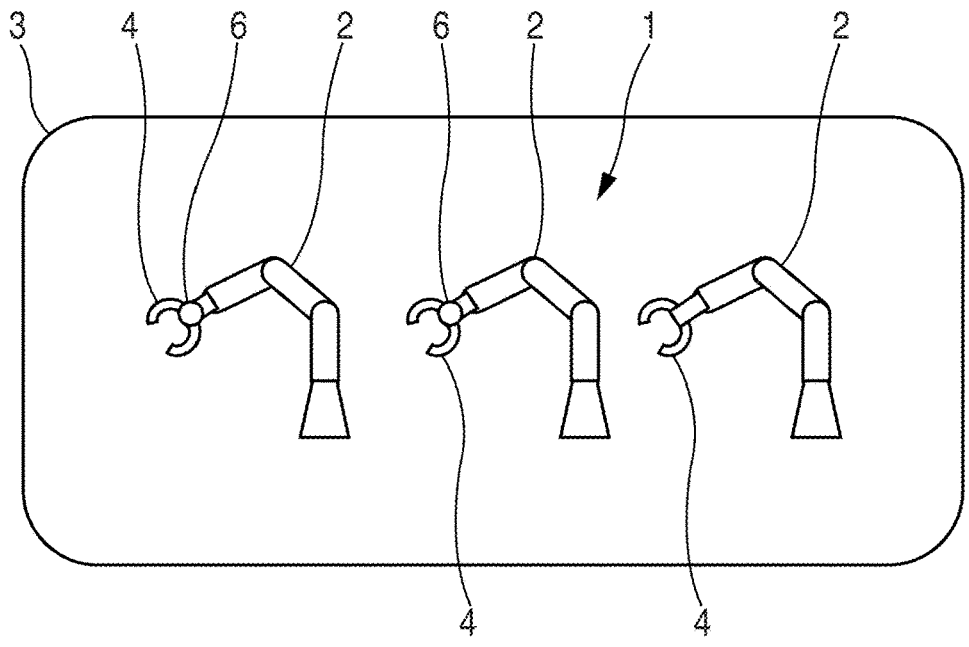
FIG. 2 shows a schematic view of robotic devices in a workspace.
Figure 3A:
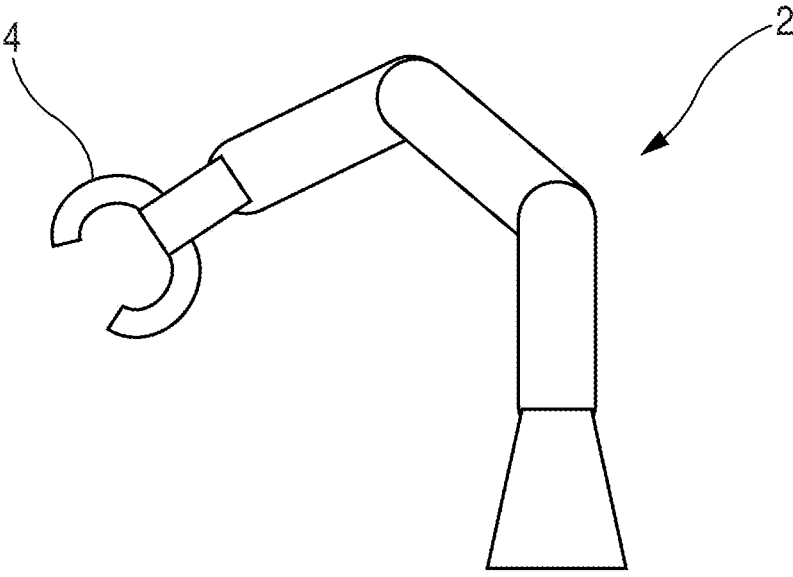
FIG. 3*a* shows a schematic of a robotic device without a pointer.
Figure 3B:
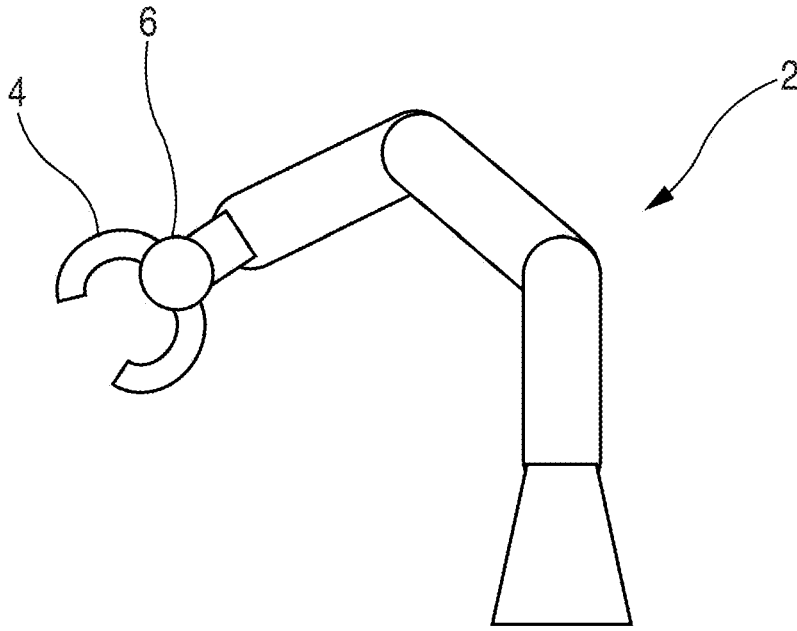
FIG. 3*b* shows a schematic of a robotic device comprising a pointer.

The motion learning system 1 is shown in FIG. 1.

The learning system can be used in the industrial field.

The learning system 1 can also be used in the field of entertainment, such as sports, cinema, amusement parks or game consoles. For example, the learning system 1 can be used for events in which speakers are located at a distance from each other.

The learning system is designed to program at least one robotic device 2 equipped with at least one effector 4. The robotic device 2 or each of the robotic devices 2 has at least one degree of freedom of motion. The robotic device or devices 2 are intended to evolve in a workspace 3.

The robotic devices shown in FIG. 1, FIG. 2, FIG. 3*a*, FIG. 3*b* and FIG. 4 are an example of a robotic device 2. Other types of robotic devices 2 may be used. In these figures, they correspond to manipulator arms. These manipulator arms comprise an effector 4 at their free end. The effectors 4 shown in these figures correspond to handling grips. Of course, other types of effectors 4 can be used. By way of non-limiting examples, the effectors 4 can be brushes, pencils, a camera 41 (FIG. 6) or any other effector.

In a non-restrictively manner, in the industrial field, the robotic device or devices 2 can be configured to carry out machine tool loading and unloading, cleaning operations on demand, finishing, gluing, quality inspection, targeted nondestructive testing, laser or water jet cutting, welding, pick and place assembly, palletising or inspection in a hostile or non-hostile environment.

Furthermore, each robotic device 2 may comprise one or more identical or different effectors 4. In addition, the assembly of the robotic devices 2 may comprise effectors 4 that are different from each other.

The learning system 1 comprises a storage module 5 of workspace 3. The storage module 5 is configured to store parameters representative of the workspace 3.

Figure 6:
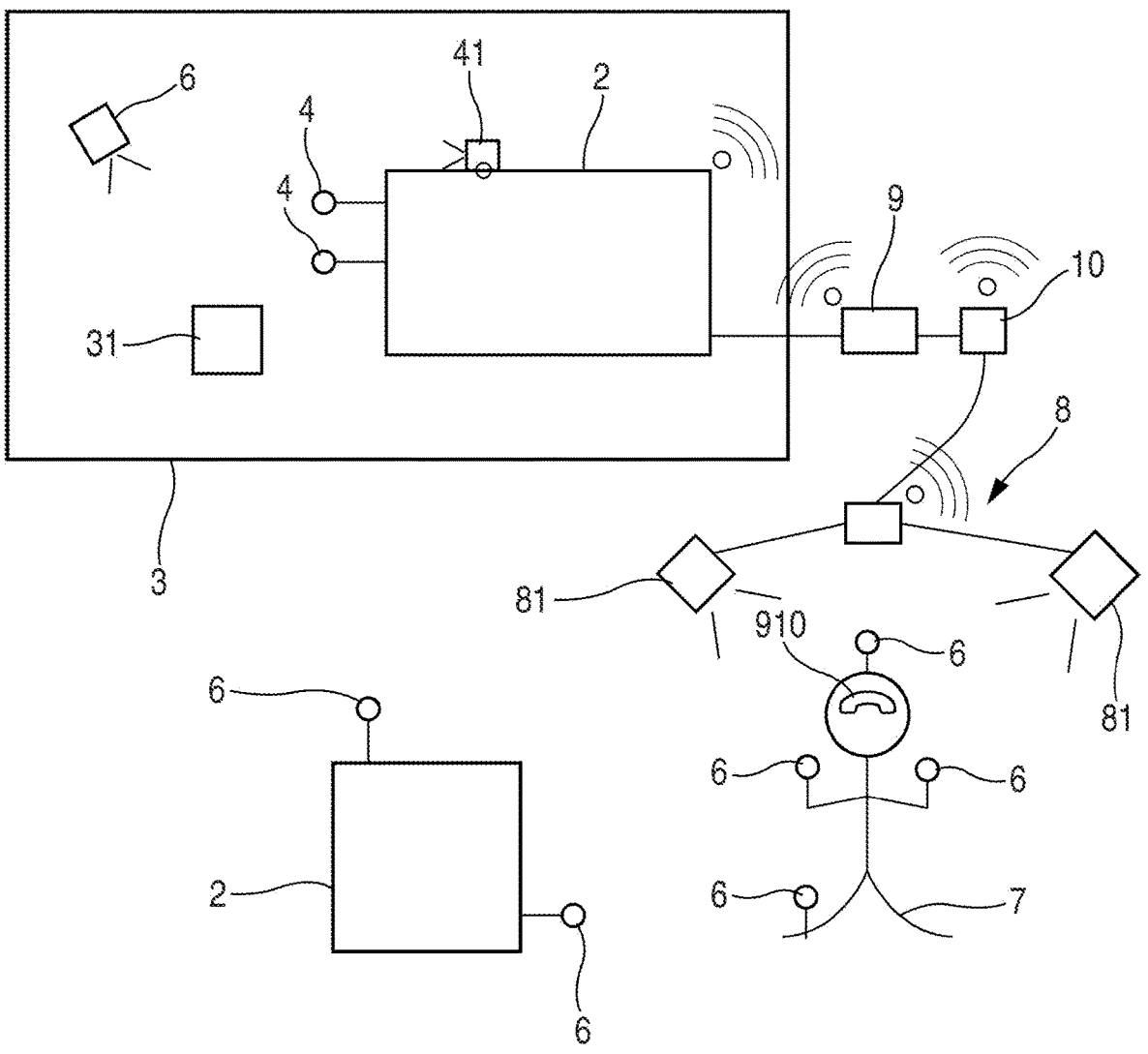
FIG. 6 shows a schematic representation of an embodiment of an implementation of the learning system.

The parameters representative of the workspace 3 correspond to a numerical representation of the workspace 3. For example, the numerical representation of the workspace 3 comprises a room in which the robotic device or devices are intended to evolve and elements 31 contained within the room (FIG. 6). The part to be processed by the robotic device or devices 2 may be comprised in the numerical representation of the workspace 3.

The storage module 5 may comprise an on-board three-dimensional mapping unit. The mapping unit, arranged in the workspace 3, allows to carry out a mapping of the workspace 3, at least the envelope of the workspace 3.

The learning system 1 also comprises at least one pointer 6. The pointer 6 or each of the pointers 6 is associated with an effector 4 of a robotic device 2.

The pointer 6 or each of the pointers 6 may be representative of the effector 4 with which it is associated. Thus, the pointer 6 or each of the pointers 6 may be representative of the effector 4 with which it is associated for at least one of the following characteristics: shape, mass, centring with respect to the robotic device 2, inertia, material or materials making up the effector 4, ergonomics or any other relevant characteristic of the effector 4.

For example, if the effector 4 is representative of a brush, the pointer 6 may be representative of the width of the brush. If the effector 4 is representative of a laser scraper, the pointer 6 may be representative of the width (or diameter) of the laser beam and the focal length relative to the optical system of the laser scraper.

The pointer 6 or each of the pointers 6 may be representative of a function or functions to be carried out by the effector or effectors 4 with which the pointer or each of the pointers 6 is associated. Thus, the pointer 6 or each of the pointers 6 may be representative of at least one of the following activities: a calibration activity, a reverse engineering activity, or any other relevant activity intended to be performed by the effector 4 or by each of the effectors 4.

The numerical representation of the workspace 3 may comprise a numerical representation of the effector or effectors 4 intended to be used by the robotic device or by each of the robotic devices 2.

The pointer 6 or each of the pointers 6 is configured to be driven by at least one user 7 along a trajectory that is intended to be carried out in the workspace 3 by the effector 4 or by each of the effectors 4. In the event that the learning system 1 comprises a plurality of pointers 6, each of the pointers 6 is driven along a trajectory which may be different from the trajectory of another of the pointers 6. Similarly, when a plurality of pointers 6 are associated with effectors 4 of a single robotic device 2, each of these pointers 6 is driven along a trajectory that may be different from the trajectory of another of the pointers 6 of the same robotic device 2.

According to one embodiment (FIG. 3*b*), the pointer or pointers 6 of a robotic device 2 may be attached in the vicinity of the location or locations where the effector or effectors 4 are attached to the robotic device 2. The user therefore drives the pointer or pointers 6 of the robotic device 2 by driving the robotic device 2 along the trajectory that is intended to be performed by the effector or effectors 4.

In another embodiment, the pointer or pointers 6 are attached to the already programmed robotic device. The pointer or pointers 6 are then driven by the already programmed robotic device by performing the trajectory that this robotic device is programmed to perform. The already programmed robotic device may be in the workspace 3 or outside the workspace 3. For example, the trajectory and the parameters of the trajectory stored by the trajectory capture module 8 are transmitted to a post-processing module 10 described below or to a trajectory visualisation module 9 via a wire link or a remote link. The remote link may be, but is not limited to, a link over the Internet, a communication protocol allowing bi-directional exchange of data over short distances (such as the "Bluetooth" standard or the "Wi-Fi" standard), or any other wireless communication protocol.

Figures 4, 5:
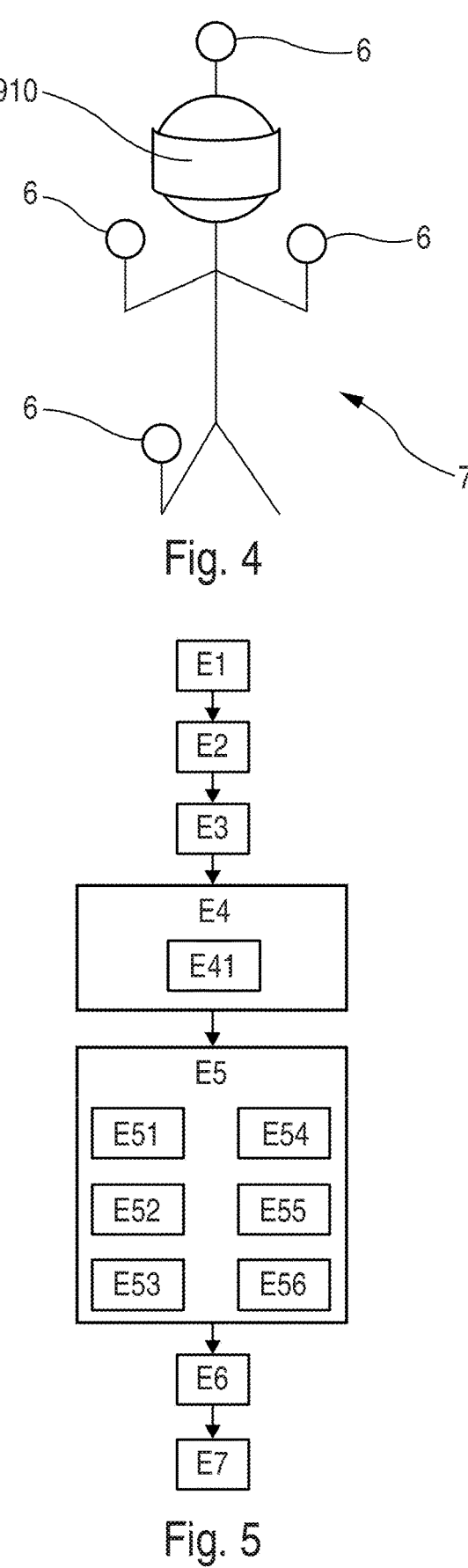
FIG. 4 shows a schematic view of a user carrying several pointers.
FIG. 5 shows a schematic representation of the learning method.

According to another embodiment (FIG. 4), the pointer or pointers 6 of at least one robotic device 2 may be worn by the user 7. In FIG. 4, the user wears a pointer 6 on the head, a pointer 6 on each hand and a pointer 6 on a foot. The user 7 can then make a different trajectory for each of the pointers 6. The trajectory of each of the pointers 6 corresponds to the trajectory to be performed by the associated effectors 4. The user may be in the workspace 3 or outside the workspace 3. For example, the trajectory and the parameters of the trajectory stored by the trajectory capture module 8 are transmitted to a post-processing module 10 described below or to a trajectory visualisation module 9 via a wire link or a remote link. The remote link may be, but is not limited to, a link over the Internet or a communication protocol that allows bi-directional exchange of data over short distances (such as the "Bluetooth" standard or the "Wi-Fi" standard), or any other wireless communication protocol. This embodiment allows the robotic device or devices 2 to be dispensed with to implement the learning system 1. In this embodiment, physically displacing the robotic device or devices 2 is no longer necessary.

The learning system 1 also comprises a trajectory capture module 8. The trajectory capture module 8 is configured to store the trajectory made by the pointer 6 or by each of the pointers 6 and to store parameters of the trajectory made by the pointer 6 or by each of the pointers 6.

The parameters of the trajectory may comprise the speed of the pointer 6 or of each of the pointers 6, the acceleration of the pointer 6 or of each of the pointers 6, etc. Other relevant parameters of the trajectory may also be stored.

The operation of the trajectory capture module 8 is advantageously based on a technique of the motion capture. For example, the trajectory capture module 8 may comprise at least one video sensor 81, such as a camera (FIG. 6). This video sensor or sensors 81 captures images of the positions that the pointer or pointers 6 take while being driven. The trajectory of the pointer 6 or of each of the pointers 6 is then determined by processing the images captured by the video sensors.

Other motion capture techniques can be used. For example, the pointer or pointers 6 may comprise a motion sensor. The trajectory can then be captured by the trajectory capture module 8 from the motions detected by the motion sensor of the pointer or pointers 6. The detected motions can be transmitted to the trajectory capture module 8 by wired or wireless communication. For example, the detected motions are transmitted to the trajectory capture module 8 via the Internet or a communication protocol that allows bi-directional exchange of data over short distances (such as the "Bluetooth" standard or the "Wi-Fi" standard), or any other wireless communication protocol.

The learning system 1 may also comprise an interface (not shown) configured to generate control commands allowing to activate complementary axes of displacements when capturing the trajectory of the pointer or pointers 6. The additional displacement axes can correspond to the activation of motorised rail or additional actuators. For example, the interface may activate the displacement of the robotic device or devices 2 while the trajectory of the pointer or pointers 6 is captured. For example, the robotic device or devices 2 may be installed on at least one rail allowing the displacement of the robotic device or devices 2 along the rail or the rails. The interface allows to control the displacement of the robotic device or devices 2 along the rail or rails. The interface may comprise an input means allowing for a user to control the generation of control commands by the interface to activate one or more complementary axes of displacement during the capture of the trajectory of the pointer or pointers 6.

Advantageously, the learning system 1 may also comprise a module 9 for visualizing the trajectory. The module 9 for visualizing the trajectory is configured to visualize the trajectory made by the pointer 6 or by each of the pointers 6 in relation to the parameters representative of the workspace 3.

According to an embodiment, the module 9 for visualizing the trajectory may be configured to visualise the trajectory in real time.

In another embodiment, the module 9 for visualizing the trajectory may be configured to display the trajectory in delayed time.

In a first embodiment, the trajectory visualisation module 9 comprises an augmented reality simulation sub-module 91. The augmented reality simulation sub-module 91 may comprise a headset 910 to be worn by the user 7 so that the user 7 visualises the motions of the robotic device or devices 2 in the workspace 3 as it drives the pointer or pointers 6 along trajectories, as shown in FIG. 4. The simulation sub-module 91 may comprise a camera mounted in the workspace 3 for the user 7 to visualize the trajectories in the workspace 3. This embodiment is advantageously used when the user 7 is not in the workspace 3.

In a second embodiment, the visualisation module 9 comprises an alert sub-module 92. The alert sub-module 92 is configured to alert the user 7 of an incompatible trajectory of the pointer 6 or at least one of the pointers 6. The trajectory may be incompatible if the degree or degrees of freedom of the robotic device or devices 2 do not allow said trajectory to be made by the effector or effectors 4 with which the pointer or pointers 6 are associated. The trajectory may also be inconsistent with respect to the parameters representative of the workspace 3 in which the robotic device or devices 2 are intended to evolve if the trajectory collides with an element 31 of the workspace 3.

According to a third embodiment, the visualisation module 9 comprises a display screen which is intended to display the motions of the robotic device or devices 2 in the workspace 3.

This alert sub-module 92 allows to inform the user 7 that the motion required for the robotic device or devices 2 to complete the trajectory of the effector or effectors 4 enters an alert area in which the trajectory is not technically feasible by the robotic device or devices 2. This alert sub-module 92 may also inform the user 7 that the trajectory of the effector or effectors 4 may enter an alert area where the trajectory collides with an element 31 of the workspace 3. In order for the alert to be given to the user 7, the alert sub-module 92 may comprise a visual alert unit and/or a haptic alert unit and/or an acoustic unit.

The visual unit may comprise a light device that can emit a light signal to alert the user 7. For example, the light device emits a green light signal when the trajectory is away from the alert area. The light device emits an orange light signal to indicate to the user 7 that the trajectory is approaching the alert area. The light device emits a red light signal to indicate to the user 7 that the trajectory has entered the alert area.

The haptic unit may comprise a vibrating element that generates a vibration to alert the user 7. For example, the vibration is modulated according to the distance from the alert area. In a non-limiting way, the vibration may have a frequency that increases as the trajectory approaches the alert area.

The acoustic unit may comprise a sound element that emits a sound to alert the user 7. For example, the sound is modulated according to the distance from the alert area. In a non-limiting way, the vibration may have a volume that increases as the trajectory approaches the alert area.

The learning system 1 also comprises a post-processing module 10.

The post-processing module 10 is configured to determine for each of the robotic devices 2 a trajectory compatible of the effector or effectors 4 with the degree or the degrees of freedom of motion of each of the robotic devices 2 from the trajectory made by the pointer 6 or by each of the pointers 6 stored by the trajectory capture module 8. The post-processing module 10 is also configured to determine for each of the robotic devices 2 compatible parameters of said compatible trajectory of the effector 4 from the parameters stored by the trajectory capture module 8.

According to a first embodiment, the post-processing module 10 comprises a display sub-module 101 configured to display points of the trajectory made by the pointer or by each of the pointers 6 and stored by the trajectory capture module 8, a display sub-module 102 configured to display the workspace 3 from the parameters representative of the workspace 3 stored by the storage module 5, and a display sub-module 103 configured to display the parameters of the trajectory made by the pointer 6 or by each of the pointers 6 and stored by the trajectory capture module 8. The parameters can be displayed numerically or graphically. The post-processing module 10 further comprises an input sub-module 104 configured to allow a user 7 to modify points of the trajectory stored by the trajectory capture module 8 and/or modify the parameters of the trajectory stored by the trajectory capture module 8 to obtain said compatible trajectory for the effector 4 or for each of the effectors 4 of the robotic device 2 or of each of the robotic devices 2 and/or said compatible parameters. These sub-modules 101, 102, 103 and 104 thus give the user 7 the possibility to edit the points of the trajectory made by the pointer 6 or by each of the pointers 6 as well as the parameters of the trajectory made by the pointer 6 or by each of the pointers 6. The user 7 can then modify points on the trajectory and parameters of the trajectory so that this trajectory and these parameters are compatible.

In a second embodiment, the post-processing module 10 comprises a simulation sub-module 105. The simulation sub-module is configured to simulate said compatible trajectory of the effector 4 or of each of the effectors 4 of the robotic device 2 or robotic devices 2 and the workspace 3 from parameters representative of the workspace 3. The simulation sub-module 105 may comprise an augmented reality simulation unit 1051 or a display screen. The simulation sub-module 105 may comprise a camera mounted in the workspace 3 so that the user 7 can visualize the compatible trajectories in the workspace 3 as well as the motions performed by the robotic device 2 to perform the compatible trajectories.

According to a variant of the second embodiment (FIG. 4), the camera can be controlled by a pointer 6 attached to the user's head 7. Control commands are sent to the camera from the motions of the pointer, which follow the motions of the head to which it is attached. The user 7 may also wear a headset 910 which allows the user 7 to visualize the compatible trajectories in the workspace 3 as well as the motions performed by the robotic device 2 to perform the compatible trajectories through visual feedback from the camera.

In a third embodiment, the post-processing module 10 comprises a reproduction sub-module 106. The reproduction sub-module 106 is configured to transmit to the robotic device 2 or robotic devices 2 control commands representative of the trajectory of the pointer 6 or of each of the pointers 6, so that the effector or effectors 4 of the robotic device 2 or of each of the robotic devices 2 simultaneously replicate the trajectory of the pointer 6 or of each of the pointers 6 driven by the user or the users 7. This mode thus allows to obtain said compatible trajectory for the effector 4 or of each of the effectors 4 of the robotic device 2 or of each of the robotic devices 2 and/or said compatible parameters. This embodiment is also advantageously used when the user 7 is not in the workspace 3.

The first embodiment, the second embodiment and the third embodiment can be combined. Thus, when the user modifies the points of the trajectory and/or modifies the parameters of the trajectory, he can verify these modifications by visualizing them thanks to the visualisation sub-module 104 before validating these modifications.

The learning system 1 also comprises a saving module 11. The saving module 11 is configured to save the compatible trajectory and the compatible parameters of the robotic device 2 or of each of the robotic devices 2. The saving can be carried out after a validation by the user 7.

The learning system 1 also comprises a program generation module 12. The program generation module 12 is configured to generate and save a program from the compatible trajectory and compatible parameters saved by the saving module 11. The generated program has a language that is compatible with a language allowing for setting the robotic device or devices 2 in motion. Thus, based on the type of robotic device or devices 2 used, the program generation module 12 translates data representative of the compatible trajectory and compatible parameters saved by the saving module 11 into a program with a language compatible with the robotic device or devices 2 to perform the trajectory. The type of robotic device or devices 2 can be entered by the user or users 7 to be provided to the program generation module 12. The type of robotic device or devices 2 may also be provided by a signal representative of the type of robotic device or devices 2 transmitted from the robotic device or devices 2 to the program generation module 12.

The learning system 1 can be used in a robotic system S in a workspace 3.

This robotic system S comprises at least one robotic device 2 equipped with at least one effector 4 and having at least one degree of freedom of motion. The robotic system comprises the learning system 1 and an execution module 13 configured to cause the robotic device 2 or each of the robotic devices 2 to execute the compatible trajectory saved by the saving module 11 according to the compatible parameters saved by the saving module 11. The execution module 13 executes the program generated by the program generation module 12.

The motion learning system 1 thus proposes a new approach to programming based on the captured technical gesture. The programming is done by capturing the actual technical gesture, and under the supervision of the learning system 1, which ensures that the incompatibilities and the unwanted interactions between the robotic device or devices and their environment (during programming and during execution) are avoided. The learning system 1 also allows synchronous or asynchronous operation of the robotic system, locally or remotely, in relation to the captured technical gesture. Unlike offline programming (of robots, via software), the actual technical gesture will here be captured and faithfully implemented with the learning system 1, as well as all the associated parameters applied by a user, human or not. The traditional offline programming does not allow for this and only allows for an approximation of this technical gesture, which will then have to be refined through tests, without ever being the real gesture.

The invention also relates to a method for motion learning (FIG. 5). The learning method is intended to program at least one robotic device 2 equipped with at least one effector 4 and having at least one degree of freedom of motion.

The learning method comprises at least the following steps:

a storage step E1, implemented by the workspace 3 storage module 5, consisting in storing parameters representative of the workspace 3 in which the robotic device or devices 2 are intended to evolve;

at least one step E2 of driving at least one pointer 6, implemented by at least one user 7, the user or users 7 driving at least one pointer 6 associated respectively with an effector 4 of a robotic device 2, the pointer 6 or each of the pointers 6 being driven by the user or users 7 along a trajectory which is intended to be made in the workspace 3 by the effector 4 or by each of the effectors 4;

a trajectory capture step E3, implemented by the trajectory capture module 8, consisting in storing the trajectory made by the pointer 6 or by each of the pointers 6 as well as storing the parameters of the trajectory made by the pointer 6 or by each of the pointers 6, the pointer 6 or each of the pointers 6 being representative of one or more functions to be carried out by the effector or effectors 4 with which the pointer 6 or each of the pointers 6 is associated;

a saving step E6, implemented by the saving module 11, consisting in saving the compatible trajectory and the compatible parameters of the robotic device 2 or of each of the robotic devices 2.

Advantageously, the learning method also comprises a program generation step E7, implemented by the program generation module 12, consisting in generating and saving a program from the compatible trajectory and the compatible parameters saved by the saving module 11. The program has a language that is compatible with a language allowing for setting the robotic device or devices 2 in motion.

Advantageously, the learning method comprises a step E4 of visualizing the trajectory, implemented by the module 9 for visualizing the trajectory, consisting in visualizing the trajectory made by the pointer 6 or by each of the pointers 6 with respect to the parameters representative of the workspace 3.

According to an embodiment, the step E4 of visualizing the trajectory can be carried out in real time, i.e., the step E4 of visualizing the trajectory can be executed simultaneously with the execution of the step E3 of capturing the trajectory.

According to another embodiment, the step E4 of visualizing the trajectory may be carried out in delayed time, i.e., the step E4 of visualizing the trajectory may be executed after or offset from the execution of the step E3 of capturing the trajectory.

The post-processing step E5 consists in determining for each of the robotic devices 2:

a trajectory compatible of the effector or effectors 4 with the degree or degrees of freedom of motion of the robotic device 2 or of each of the robotic devices 2 from the trajectory made by the pointer 6 or by each of the pointers 6 stored in the trajectory capture step E3 and compatible parameters of said compatible trajectory of the effector or effectors 4 from the parameters stored in the trajectory capture step E3.

The post-processing step E5 may comprise:

a display sub-step E51, implemented by the display sub-module 101, consisting in displaying points of the trajectory made by the pointer 6 or by each of the pointers 6;

a display sub-step E52, implemented by the display sub-module 102, consisting in displaying the workspace from the parameters representative of the workspace stored in the storage step E1;

a display sub-step E53, implemented by a display sub-module 103, consisting in displaying the parameters of the trajectory made by the pointer 6 or by each of the pointers 6;

an input sub-step E54, implemented by the input sub-module 104, consisting in allowing a user 7 to modify points of the trajectory stored in the trajectory capture step E3 and/or to modify the parameters of the trajectory stored in the trajectory capture step E3 to obtain said compatible trajectory for the effector 4 or by each of the effectors 4 of the robotic device 2 or of each of the robotic devices 2 and/or said compatible parameters.

The post-processing step E5 may also comprise a simulation sub-step E55, implemented by the simulation sub-module 105, consisting in simulating said compatible trajectory of the effector 4 or of each of the effectors 4 of the robotic device 2 or of each of the robotic devices 2 and the workspace 3 from parameters representative of the workspace 3.

The post-processing step E5 may comprise a reproduction sub-step E56, implemented by the reproduction sub-module 106, consisting in transmitting to the robotic device 2 or to the robotic devices 2 control commands representative of the trajectory of the pointer 6 or of each of the pointers 6, so that the effector or effectors 4 of the robotic device 2 or of each of the robotic devices 2 simultaneously reproduce the trajectory of the pointer 6 or of each of the pointers 6 driven by the user or users 7, in order to obtain said compatible trajectory for the effector 4 or for each of the effectors 4 of the robotic device 2 or of each of the robotic devices 2 and/or said compatible parameters.

The visualisation step E4 may also comprise an alerting sub-step E41, implemented by the alert sub-module 92, consisting in alerting the user 7 of an incompatible trajectory of the pointer 6 or of at least one of the pointers 6, the trajectory being incompatible if the degree or degrees of freedom of the robotic device or devices 2 do not allow said trajectory by the robotic device or devices 2 to which the pointer or pointers 6 are associated to be made.

The alerting sub-step E41 may also consist in alerting the user 7 of an incompatible trajectory of the pointer 6 or at least one of the pointers 6 with respect to parameters representative of the workspace 3 in which the robotic device or devices 2 are intended to evolve.

As mentioned at the beginning of the description, the learning system 1 can be used in the industrial field or in the entertainment field.

As an example in the field of entertainment, the learning system 1 can be used to play tennis remotely. A robotic system 2 equipped with a racket, corresponding to an effector, can be located on a tennis court. A user 7 equipped with a pointer 6 representative of the racket or a racket equipped with a pointer 6 is located outside the tennis court. A camera allows the user to visualize the tennis court using a headset 910. The motion of the pointer 6 representative of the racket or the racket equipped with the pointer 6 can then be reproduced by the racket of the robotic device 2 thanks to the learning system 1.

For example, in the industrial field, the learning system 1 can be used for a remote inspection in a nuclear facility, such as a nuclear power plant. A mobile robotic device 2 is, for example, equipped with a camera and an effector. A user 7 may be equipped with a pointer allowing to control the motions of the camera, a pointer allowing to control the arm equipped with the effector and an interface allowing to generate control commands allowing to displace the robotic device 2.

The invention claimed is:

1. A method for learning motion for programming at least one robotic device equipped with at least one effector and having at least one degree of freedom of motion, the robotic device or devices being intended to evolve in a workspace, characterised in that it comprises the following steps:

a storage step, implemented by a workspace storage module, consisting in storing parameters representative of the workspace in which the robotic device or devices are intended to evolve;

at least one step of driving at least one pointer, implemented by at least one user, the user or users driving at least one pointer associated respectively with an effector of a robotic device, the pointer or each of the pointers being driven by the user or users along a trajectory which is intended to be made in the workspace by the effector or by each of the effectors, the pointer or each of the pointers being representative of one or more functions to be made by the effector or effectors with which the pointer or each of the pointers is associated;

a trajectory capture step, implemented by a trajectory capture module, consisting in storing the trajectory made by the pointer or by each of the pointers as well as in storing parameters of the trajectory made by the pointer or by each of the pointers;

a post-processing step, implemented by a post-processing module, consisting in determining for each of the robotic devices:

a trajectory compatible of the effector or effectors with the degree or degrees of freedom of motion of the robotic device or of each of the robotic devices from the trajectory made by the pointer or by each of the pointers stored in the trajectory capture step and compatible parameters of said compatible trajectory of the effector or effectors from the parameters stored in the trajectory capture step;

a saving step, implemented by a saving module, consisting in saving the compatible trajectory and the compatible parameters of the robotic device or of each of the robotic devices; and a step for visualizing the trajectory, implemented by a visualisation module for visualizing the trajectory, consisting in visualizing the trajectory made by the pointer or by each of the pointers with respect to the parameters representative of the workspace, the visualisation step comprising an alerting sub-step implemented by an alert sub-module, the alerting sub-step consisting in alerting the user of an incompatible trajectory of the pointer or of at least one of the pointers, the trajectory being incompatible when the degree or the degrees of freedom of the robotic device or devices do not allow said trajectory to be made by the robotic device or devices with which the pointer or pointers are associated.

2. The method according to claim 1, characterised in that it further comprises a program generation step, implemented by a program generation module, consisting in generating and saving a program from the compatible trajectory and the compatible parameters saved by the saving module, the program having a language compatible with a language allowing the robotic device or devices to be set in motion.

3. The method according to claim 1, characterised in that the post-processing step comprises:

a first display sub-step, implemented by a first display sub-module consisting in displaying points of the trajectory made by the pointer or by each of the pointers;

a second display sub-step, implemented by a second display sub-module, consisting in displaying the workspace from the parameters representative of the workspace stored in the storage step;

a third display sub-step, implemented by a second display sub-module, consisting in displaying the parameters of the trajectory made by the pointer or by each of the pointers;

an input sub-step, implemented by an input sub-module, consisting in allowing a user to modify points of the trajectory stored in the trajectory capture step and/or to modify the parameters of the trajectory stored in the trajectory capture step in order to obtain said compatible trajectory for the effector or for each of the effectors of the robotic device or of each of the robotic devices and/or said compatible parameters.

4. The method according to claim 1, characterised in that the post-processing step comprises a simulation sub-step, implemented by a simulation sub-module, consisting in simulating said compatible trajectory of the effector or of each of the effectors of the robotic device or robotic devices as well as the workspace on the basis of parameters representative of the workspace.

5. The method according to claim 1, characterised in that the post-processing step comprises a reproduction sub-step, implemented by a reproduction sub-module, consisting in transmitting to the robotic device or to the robotic devices control commands representative of the trajectory of the pointer or of each of the pointers to cause the effector or effectors of the robotic device or of each of the robotic devices to simultaneously reproduce the trajectory of the pointer or of each of the pointers driven by the user or the users, in order to obtain said compatible trajectory for the effector or for each of the effectors of the robotic device or of each of the robotic devices and/or said compatible parameters.

6. The method according to claim 1, characterised in that the alerting sub-step consists in alerting the user of an incompatible trajectory of the pointer or of at least one of the pointers with respect to the parameters representative of the workspace in which the robotic device or devices are intended to evolve.

7. A motion learning system for programming at least one robotic device equipped with at least one effector and having at least one degree of freedom of motion, wherein the robotic device or devices are intended to evolve in a workspace, characterised in that it comprises:

a workspace storage module, configured to store parameters representative of the workspace;

at least one pointer, the pointer or each of the pointers being associated respectively with an effector of a robotic device, the pointer or each of the pointers being configured so as to be driven by at least one user according to a trajectory which is intended to be made in the workspace by the effector or by each of the effectors, the pointer or each of the pointers being representative of one or more functions to be carried out by the effector or by the effectors with which the pointer or each of the pointers is associated;

a trajectory capture module configured to store the trajectory made by the pointer or by each of the pointers and to store parameters of the trajectory made by the pointer or by each of the pointers;

a post-processing module, configured to determine for each of the robotic devices:

a compatible trajectory of the effector or effectors with the degree or degrees of freedom of motion of the robotic device or of each of the robotic devices from the trajectory made by the pointer or by each of the pointers stored by the trajectory capture module and compatible parameters of said compatible trajectory of the effector or effectors from the parameters stored by the trajectory capture module;

a saving module, configured to save the compatible trajectory and the compatible parameters of the robotic device or of each of the robotic devices; and a visualisation module for visualizing the trajectory, the visualisation module configured to visualise the trajectory made by the pointer or by each of the pointers with respect to the parameters representative of the workspace, the visualisation module comprising an alert sub-module configured to alert the user of an incompatible trajectory of the pointer or of at least one of the pointers, the trajectory being incompatible if the degree or the degrees of freedom of the robotic device or devices do not allow said trajectory to be made by the effector or effectors with which the pointer or pointers are associated.

8. The system according to claim 7, characterised in that it further comprises a program generation module, configured to generate and save a program from the compatible trajectory and the compatible parameters saved by the saving module, the program having a language compatible with a language allowing a set in motion of the robotic device or devices.

9. The system according to claim 7, characterised in that the post-processing module comprises:

a first display sub-module, configured to display points of the trajectory made by the pointer or by each of the pointers and stored by the trajectory capture module;

a second display sub-module, configured to display the workspace from parameters representative of the workspace stored by the storage module;

a third display sub-module, configured to display the parameters of the trajectory made by the pointer or by each of the pointers and stored by the trajectory capture module;

an input sub-module, configured to allow a user to modify points of the trajectory stored by the trajectory capture module and/or modify the parameters of the trajectory stored by the trajectory capture module to obtain said compatible trajectory for the effector or for each of the effectors of the robotic device or of each of the robotic devices and/or said compatible parameters.

10. The system according to claim 7, characterised in that the post-processing module comprises a simulation sub-module, configured to simulate said compatible trajectory of the effector or of each of the effectors of the robotic device or robotic devices and the workspace from parameters representative of the workspace.

11. The system according to claim 10, characterised in that the simulation sub-module comprises an augmented reality simulation unit.

12. The system according to claim 7, characterised in that the post-processing module comprises a reproduction sub-module, configured to transmit to the robotic device or to the robotic devices control commands representative of the trajectory of the pointer or of each of the pointers, to cause the effector or effectors of the robotic device or of each of the robotic devices to simultaneously reproduce the trajectory of the pointer or of each of the pointers riven by the user or the users, to obtain said compatible trajectory for the effector or for each of the effectors of the robotic device or of each of the robotic devices and/or said compatible parameters.

13. The system according to claim 7, characterised in that the visualisation module comprises an augmented reality simulation sub-module.

14. The system according to claim 7, characterised in that the alert sub-module is configured to alert the user to an incompatible trajectory of the pointer or at least one of the pointers with respect to the parameters representative of the workspace in which the robotic device or devices are intended to evolve.

15. A robotic system, characterised in that it comprises:

a learning system according to claim 1, the at least one robotic device equipped with the at least one effector and having the at least one degree of freedom of motion, and an execution module, configured to cause the robotic device or each of the robotic devices to execute the compatible trajectory and the compatible parameters saved by the saving module.

*   *   *   *   *